(12) United States Patent
Uchida

(10) Patent No.: US 7,753,443 B2
(45) Date of Patent: Jul. 13, 2010

(54) FRAME STRUCTURE OF SEATBACK FOR VEHICLE

(75) Inventor: Shingo Uchida, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 270 days.

(21) Appl. No.: 11/925,455

(22) Filed: Oct. 26, 2007

(65) Prior Publication Data

US 2008/0258520 A1  Oct. 23, 2008

(30) Foreign Application Priority Data

Oct. 26, 2006  (JP) .............................. 2006-291228

(51) Int. Cl.
*B60N 2/42* (2006.01)
(52) U.S. Cl. .............. 297/216.13; 297/216.1; 297/216.14; 297/452.2
(58) Field of Classification Search .............. 297/216.3, 297/216.4, 452.2, 248, 257
See application file for complete search history.

(56) References Cited

U.S. PATENT DOCUMENTS

| | | | | |
|---|---|---|---|---|
| 4,192,545 A | * | 3/1980 | Higuchi et al. ......... | 297/216.13 |
| 5,054,845 A | * | 10/1991 | Vogel ................... | 297/216.14 |
| 5,676,423 A | * | 10/1997 | Pedronno et al. ........ | 297/378.1 |
| 5,829,831 A | * | 11/1998 | Sharman ................ | 297/378.12 |
| 6,347,836 B1 | * | 2/2002 | Hayotte ................ | 297/452.2 |
| 6,742,847 B2 | * | 6/2004 | Yanai .................. | 297/452.2 |
| 6,981,748 B2 | * | 1/2006 | Garnweidner et al. .... | 297/452.18 |
| 2004/0061364 A1 | * | 4/2004 | Humer et al. .......... | 297/216.14 |
| 2005/0189802 A1 | * | 9/2005 | Mattes et al. .......... | 297/216.13 |
| 2006/0103228 A1 | * | 5/2006 | Gupta et al. ........... | 297/452.65 |
| 2007/0205643 A1 | * | 9/2007 | Fujita et al. ........... | 297/216.12 |

FOREIGN PATENT DOCUMENTS

| | | |
|---|---|---|
| JP | 3-45634 | 9/1991 |
| JP | 06-014823 | 1/1994 |

OTHER PUBLICATIONS

Mechanical English translation of Japanese Patent Application 06-014823, filed Jun. 3, 1992, 17 pages.

* cited by examiner

*Primary Examiner*—Laurie K Cranmer
(74) *Attorney, Agent, or Firm*—Osha • Liang LLP

(57) ABSTRACT

A frame structure of a seatback for a vehicle includes a first frame including at least two panels and a divided portion therebetween and a second frame including tubing and bonded to the first frame substantially along a periphery of the first frame. The second frame includes an elongation deformation allowing portion for allowing a portion of the second frame to be elongated over the divided portion of the first frame in an upper side portion when a predetermined load is exerted on the seatback toward a rear of the vehicle.

8 Claims, 3 Drawing Sheets

FRAME STRUCTURE OF SEATBACK FOR VEHICLE

PRIORITY APPLICATION

This application claims priority from Japanese Patent Application No. 2006-291228, filed Oct. 26, 2006, the contents of which are hereby incorporated by reference in their entirety.

TECHNICAL FIELD

The present invention relates to a frame structure of a seatback for a vehicle.

BACKGROUND OF THE INVENTION

In a vehicle, a seatback of a rear seat is typically configured to recline and fold over a seat cushion. By doing so, the space of a luggage compartment of a vehicle may be increased.

Japanese Utility Model Publication No. (Hei.) 3-45634 (see FIG. 1) discloses such a seatback of the rear seat. Specifically, a seatback frame has a first frame with a substantially rectangular panel material. Further, the seatback frame also has a second frame with an annular pipe material, which is adhered to a panel surface of the first frame along its periphery to thereby obtain the required frame rigidity. In addition, the ends of the seatback frame, which are disposed in a lateral direction of the vehicle, are releasably engaged to the panel material of a vehicular compartment side using a locking mechanism.

In a typical rear collision, a crash load is exerted upon the seatback toward a rear of the vehicle due to an inertial force applied by a passenger sitting on the rear seat. In such a case, both the first frame consisting of the panel material and the second frame consisting of the pipe material are bent and become deformed into a bi-planar "<" shape. By doing so, the crash energy can be somewhat absorbed.

However, since the first and second frames are bent locally and deformed at the center portion, the crash energy cannot be effectively absorbed, thereby jeopardizing the safety of the driver and passengers in the vehicle.

SUMMARY OF THE INVENTION

In accordance with embodiments of the present invention, a frame structure of a seatback for a vehicle is provided. The frame structure includes a first frame including at least two panels and a divided portion therebetween and a second frame including tubing and bonded to the first frame substantially along a periphery of the first frame. The second frame includes an elongation deformation allowing portion for allowing a portion of the second frame to be elongated over the divided portion of the first frame in an upper side portion when a predetermined load is exerted on the seatback toward a rear of the vehicle.

Other aspects and advantages of the invention will be apparent from the following description and the appended claims.

DETAILED DESCRIPTION OF THE INVENTION

Embodiments of the present invention is to provide a frame structure of a seatback for a vehicle, which can increase the deformation of the frame during rear collisions of vehicles. As such, the crash energy can be effectively and optimally absorbed to thereby increase the safety of the driver and passengers in the vehicle.

The frame structure of the seatback according to embodiments of the present invention comprises a seatback frame having a first frame with a substantially square panel material and a second frame with an annular pipe material. Specifically, the second frame is adhered to a panel surface of the first frame and arranged approximately along its periphery. Further, the first frame is divided along a lateral direction of the vehicle, while the second frame is elongated along said direction. When the vehicle is involved in a rear collision and a crash load is exerted upon the seatback toward a rear direction of the vehicle, the second frame becomes bent into a "<" shape along the lateral direction of the vehicle toward its rear.

According to embodiments of the present invention, when a predetermined crash load is exerted upon the seatback toward the rear of the vehicle due to an inertial force applied by a passenger sitting on the rear seat, the second frame with the pipe material becomes bent into a "<" shape along the lateral direction of the vehicle toward its rear.

As discussed above, a conventional frame is merely bent and becomes deformed into a planar "<" shape at a center portion in the vertical direction of the vehicle. However, in the present invention, the second frame is bent into a more curved "<" shape along the lateral direction of the vehicle while extending across said direction to distribute the deformation across more of the seatback frame.

As such, the deformation of the frame is greatly increased. Thus, the crash energy can be effectively and optimally absorbed to thereby increase the safety of the driver and passengers in the vehicle.

Figure 1:
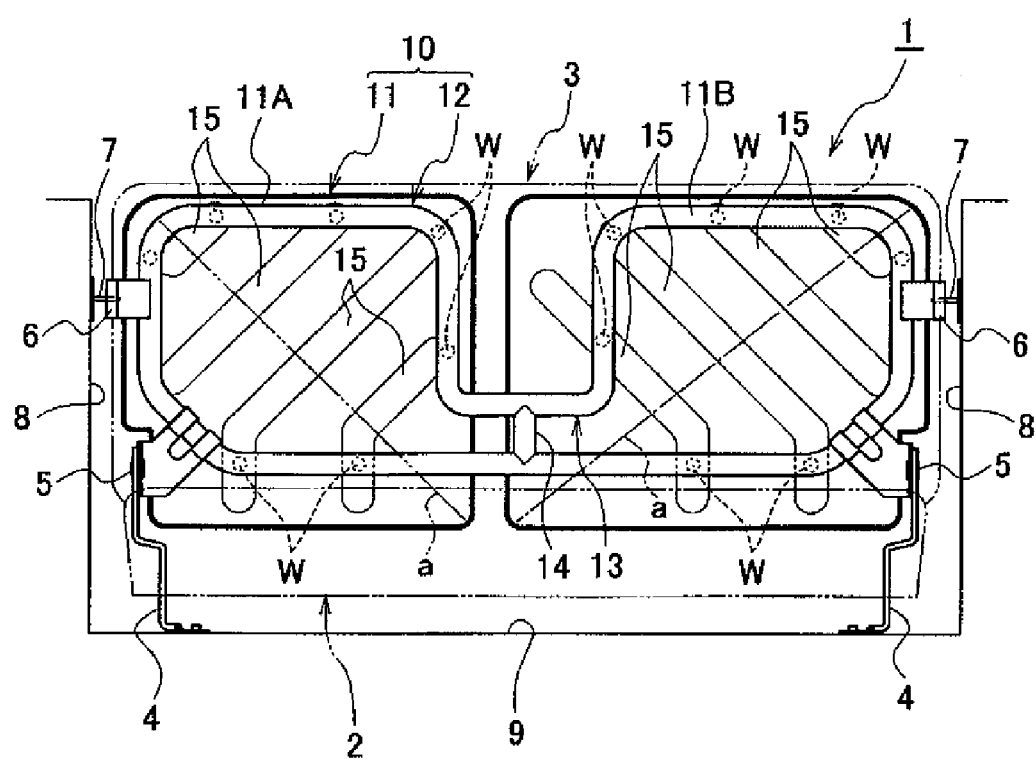
FIG. 1 is a front view of a seatback frame constructed in accordance with a first embodiment of the present invention.
Figure 2:
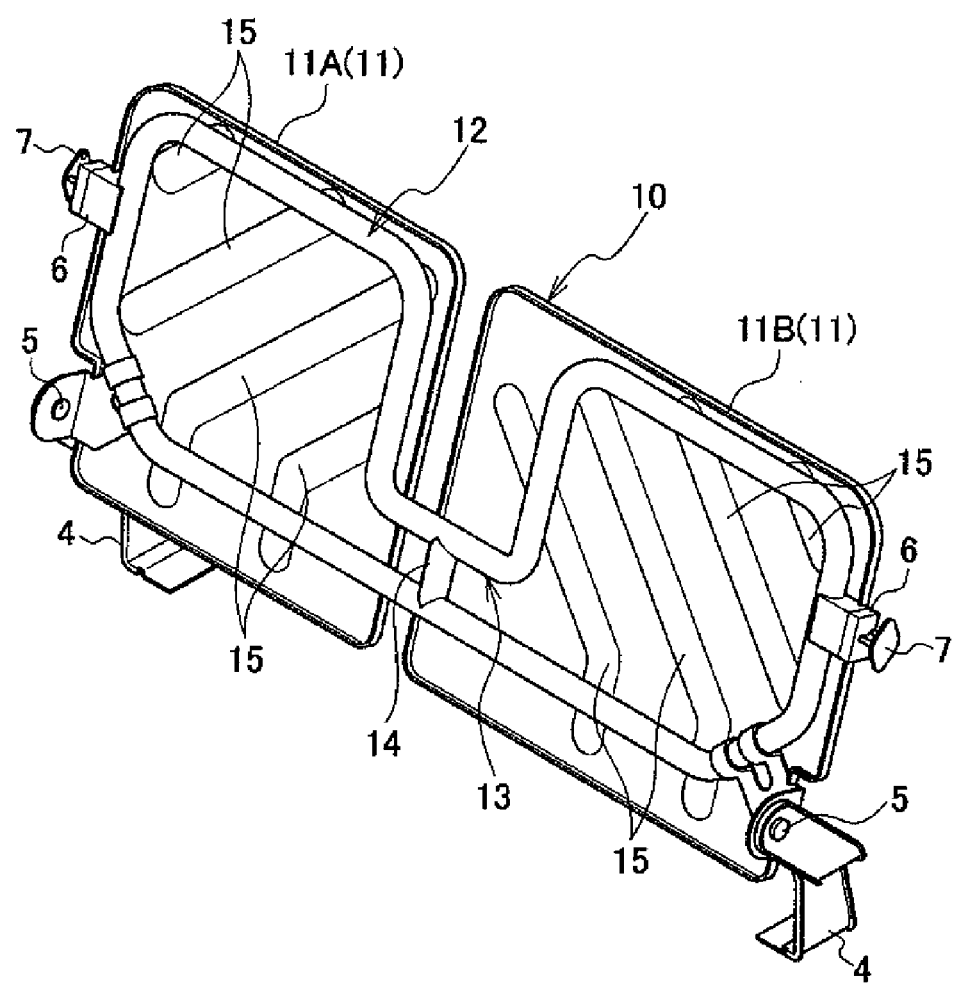
FIG. 2 is a perspective view of the seatback frame shown in FIG. 1.
Figure 3:
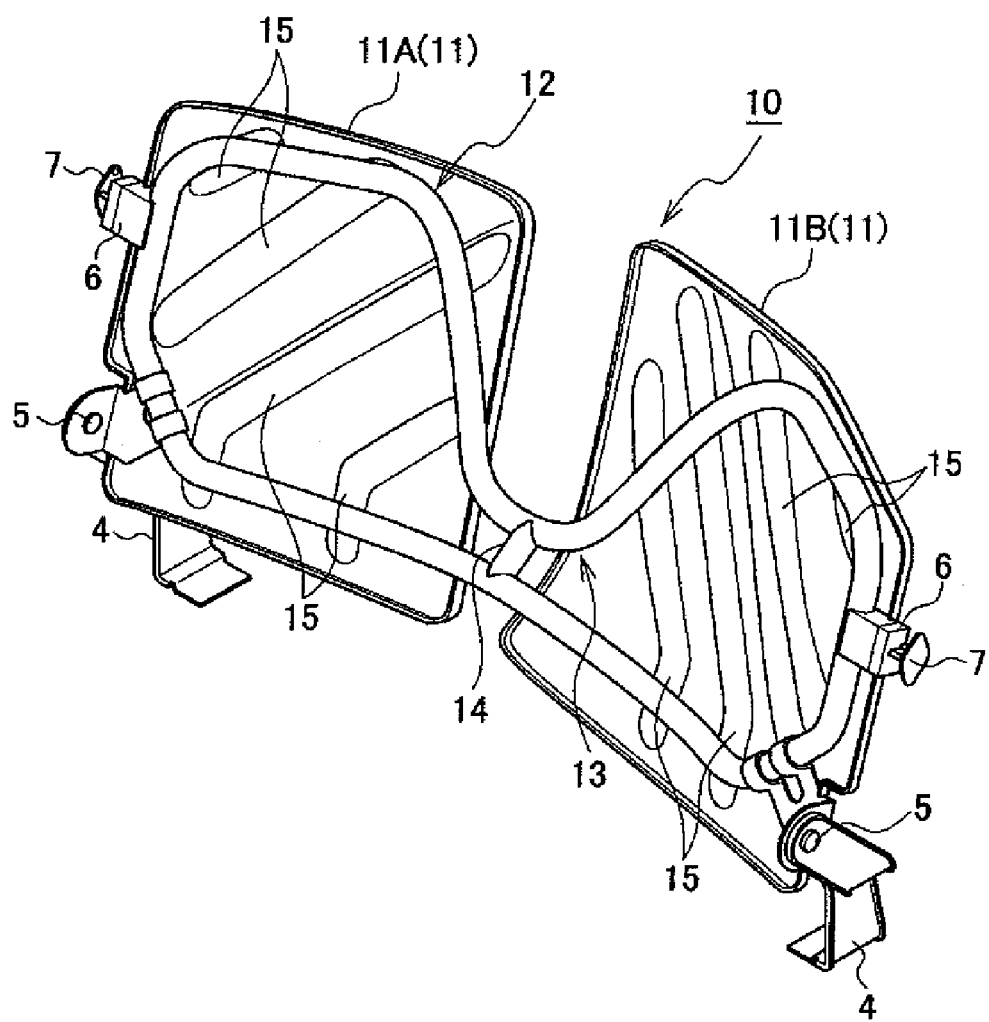
FIG. 3 is a perspective view of when the seatback frame shown in FIG. 1 becomes deformed.

FIGS. 1 to 3 illustrate a frame structure of a seatback for vehicles in accordance with an embodiment of the present invention. Specifically, FIG. 1 is a front view of a seatback frame constructed in accordance with a first embodiment of the present invention. FIG. 2 is a perspective view of the seatback frame shown in FIG. 1. FIG. 3 is a perspective view of when the seatback frame shown in FIG. 1 becomes deformed.

In FIG. 1, a rear seat 1 includes a seat cushion 2 and a seatback 3, which can fold with respect to the seat cushion 2. Further, the seatback 3 has a seatback frame 10, which includes a first frame 11 formed of panel material and a second frame 12 formed of tubing and adhered to a front surface of the first frame 11 along its periphery.

A support leg 4 is rotatably installed using a hinge pin 5 at lower portions of both ends of the seatback frame 10 along a lateral direction of the vehicle. The seatback 3 is coupled to a floor 9 by the support leg 4 so that it can fold with respect to the seat cushion 2. Further, a lock mechanism 6 is installed at upper portions of both ends of the seatback frame 10 along a lateral direction of the vehicle. The lock mechanism 6 serves to couple a striker 7, which is installed at an interior side panel 8, and to lock the seatback 3 when the seatback 3 is raised toward the rear of the vehicle from a folded state.

In the embodiment shown in FIG. 1, the first frame 11 is divided into two panels, i.e., right and left sides. The two panels may be completely separated, as shown in FIG. 1, or only partially separated. An elongation deformation allowing portion 13 is installed at an upper side portion (upper side transversal tubing) of the second frame 12. The elongation deformation allowing portion 13 allows the elongation deformation of a portion that spans the divided portions of the first frame 11 along the lateral direction of the vehicle against a predetermined front-rear load.

In the present embodiment, the elongation deformation allowing portion 13 is formed by bending an upper side portion of the second frame 12 into a substantially "U" shape (when viewed from the front) over the divided portions of the first frame 11. The second frame 12 is bonded and fixed to the panel surface of the first frame 11 by performing a bead welding operation (W) at multiple points. Further, the elongation deformation allowing portion 13 is also bonded and fixed by performing the bead welding operation (W) at multiple points. However, the elongation deformation allowing portion 13 is welded with a lower welding strength compared to other bonded portions so as to be separable by a predetermined load along the front-rear direction. Optionally, in the elongation deformation allowing portion 13, the tubing may not be bonded to the panels. Those having ordinary skill in the art will appreciate that the first and second frames may be bonded using other methods besides welding without departing from the scope of the present invention. For example, adhesives or fasteners may be used in place oft or in addition to, the welding.

Continuing with FIG. 1, a connecting frame 14 with a tubing may be installed. The connecting frame 14 connects a U-shaped center portion of the bottom portion of the elongation deformation allowing portion 13 and a lower side portion (lower side transversal tubing) of the second frame 12 along the up-down direction.

The connecting frame 14 may not be bonded to the first frame 11. Rather, the connecting frame 14 may be welded with a lower bonding strength compared to other bonding portions.

Also, in the present embodiment, a plurality of beads 15 are formed on the right and left divided panels 11A and 11B of the first frame 11. The plurality of beads 15 are obliquely curved by intersecting with a diagonal line "a," which connects a lower side corner portion of each divided end portion and an upper side corner portion of an outer side in a lateral direction of the vehicle.

In the frame structure of the seatback in accordance with embodiments of the present invention, when a predetermined load is exerted upon the seatback 3 toward the rear of the vehicle due to the inertial force applied by the passenger during rear collisions, since the upper and lower portions of both ends of the seatback frame 10 are fixed to the vehicular body side by the support leg 4 and the lock mechanism 6, the load is exerted upon the seatback frame 10 as a bending load toward the rear of the vehicle.

FIG. 3 shows the manner in which the embodiment shown in FIG. 1 will deform in response to the bending load toward the rear of the vehicle. The second frame 12 is elongated in the U-shaped elongation deformation allowing portion 13 along the lateral direction of the vehicle, while bending into "<" shape ("<" shape to the rear of the vehicle when viewed from a plane) along the lateral direction of the vehicle toward its rear.

By doing so, the right and left divided panels 11A and 11B of the first frame 11 are spread open in a bi-planar "/\"shape toward the rear of the vehicle at their divided portions by the elongation and the "<" shaped bending deformation along the lateral direction of the vehicle of the second frame 12. As a result, the divided panels 11A and 11B are bent into a "<" shape along the up-down direction from a center portion in the up-down direction of the divided end sides of each divided panels 11A and 11B. Then, such a bending is transferred to an end of an outer side along the lateral direction of the vehicle and eventually to the entire first frame 11.

As discussed above, the first frame 11 and the second frame 12 can be merely bent into the planar "<" shape at a center portion along the lateral direction of the vehicle. However, the second frame 12 is bent into the "<" shape toward the lateral direction of the vehicle, while extending along the lateral direction of the vehicle. Further, the right and left divided panels 11A and 11B of the first frame 11 are bent into the "<" shape along the up-down direction from the center portion in the up-down direction of the divided end sides, while being spread open in the "/\"shape. Therefore, since the deformation can be transferred to substantially the entire first frame 11, the deformation of the first and second frames 11 and 12 can be increased, thereby increasing the amount of crash energy absorbed by the seatback frame 10 without using a dedicated energy absorbing member.

Here, in the present embodiment, the elongation deformation allowing portion 13 is formed by bending an upper side portion of the second frame 12 into an approximately "U" shape (when viewed from the front) over the divided portions of the first frame 11, as described above. Thus, such a "U" shaped portion becomes an elongation value to thereby sufficiently secure the elongation deformation, which can be easily controlled by varying the size of the "U" shaped portion.

Further, the connecting frame 14 is provided for connecting a center of the bottom portion of the elongation deformation allowing portion 13 and a lower side portion of the second frame 12 along the up-down direction. Therefore, as shown in FIG. 3, the lower portion of the second frame 12 is also forcibly bent toward the rear of the vehicle in a "<" shape, thereby increasing the amount of crash energy absorption.

Also, a plurality of beads 15 are obliquely curved in the right and left divided panels 11A and 11B of the first frame 11. The beads 15 are intersected with a diagonal line "a," which connects the lower side corner portion of the divided end side and the upper side corner portion of the outer side along the lateral direction of the vehicle. Thus, when each panel 11A and 11B is bent into the "<" shape along the up-down direction from the center portion of the divided end side in the up-down direction, valley bending lines are easily created toward the lateral direction of the vehicle along one or more inclinations of the beads 15. Consequently, the bending deformation into the "<" shape can be smoothly transferred along the lateral direction of the vehicle of each panel 11A and 11B.

Moreover, with the bead 15, an elongation deformation may occur in each of the panels 11A and 11B along a direction approximately straight to a direction of extending the bead. By elongating the panels 11A and 11B along the direction approximately straight to the direction of extending the bead, the amount of crash energy absorbed by the seatback frame can be increased.

It is to be understood that the invention is not limited to the illustrated and described forms of the invention contained herein. It will be apparent to those skilled in the art that various alterations and modification may be made without departing from the scope of the invention, and the invention is not considered limited to what is shown in the drawing and described in the specification. Accordingly, the scope of the invention should be limited only by the attached claims.

What is claimed is:

1. A frame structure of a seatback for a vehicle, comprising:
a first frame comprising at least two panels and a divided portion therebetween; and
a second frame comprising tubing and bonded to the first frame substantially along a periphery of the first frame,
wherein the second frame comprises an elongation deformation allowing portion for allowing a portion of the second frame to be elongated over the divided portion of the first frame in an upper side portion when a predetermined load is exerted on the seatback toward a rear of the vehicle.

2. The frame structure of the seatback for the vehicle of claim 1, wherein the elongation deformation allowing portion is bent in an approximately "U" shape in a portion of the second frame corresponding to the divided portion of the first frame.

3. The frame structure of the seatback for the vehicle of claim 2, wherein the elongation deformation allowing portion comprises a connecting frame for connecting a lower portion of the approximately U-shaped portion and a lower portion of the second frame.

4. The frame structure of the seatback for the vehicle of claim 1, further comprising:
a bead formed on at least one of the at least two panels of the first frame,
wherein the bead is formed to intersect with a diagonal line connecting a lower side corner portion proximal to the divided portion of the first frame and a corner portion opposite to the lower side corner portion.

5. A frame structure of a seatback for a vehicle, comprising:
a first frame comprising at least two panels and a divided portion therebetween; and
a second frame comprising tubing and bonded to the first frame substantially along a periphery of the first frame,
wherein the second frame comprises deformation allowing means for allowing a portion of the second frame to be elongated over the divided portion of the first frame in an upper side portion when a predetermined load is exerted on the seatback toward a rear of the vehicle.

6. The frame structure of the seatback for the vehicle of claim 5, wherein the deformation allowing means is bent in an approximately "U" shape in a portion of the second frame corresponding to the divided portion of the first frame.

7. The frame structure of the seatback for the vehicle of claim 6, wherein the deformation allowing means comprises a connecting frame for connecting a lower portion of the approximately U-shaped portion and a lower portion of the second frame.

8. The frame structure of the seatback for the vehicle of claim 5, further comprising:
a bead formed on at least one of the at least two panels of the first frame,
wherein the bead is formed to intersect with a diagonal line connecting a lower side corner portion proximal to the divided portion of the first frame and a corner portion opposite to the lower side corner portion.

* * * * *